June 4, 1968     T. C. R. SHEPHERD     3,386,668
WASTE DISPOSAL APPARATUS

Filed Aug. 16, 1965     2 Sheets-Sheet 1

INVENTOR
T.C.R. SHEPHERD
BY
Stephen H. Friskany
ATTORNEY

June 4, 1968 T. C. R. SHEPHERD 3,386,668
WASTE DISPOSAL APPARATUS
Filed Aug. 16, 1965 2 Sheets-Sheet 2

INVENTOR
T. C. R. SHEPHERD
BY
ATTORNEY ns Office 3,386,668
Patented June 4, 1968

3,386,668
WASTE DISPOSAL APPARATUS
Thomas C. R. Shepherd, Maraston House, Bridstow, near Ross-on-Wye, Herefordshire, England
Filed Aug. 16, 1965, Ser. No. 479,857
Claims priority, application Great Britain, Nov. 3, 1964, 44,692/64
8 Claims. (Cl. 241—46)

ABSTRACT OF THE DISCLOSURE

A disposable textile mesh bag is removably located within the liquid tank of the apparatus, and a pump recirculates liquid from the storage tank into a comminutor, from whence a slurry drains into the bag.

---

The invention concerns improvements relating to apparatus for the disposal of waste, in particular though not exclusively, used disposable hypodermic syringes.

Such disposable hypodermic syringes are now commonly used in which the body or cylinder assembly is made of synthetic resin plastics material which is supplied ready filled with a required dosage of a treatment liquid and then thrown away after use. The apparatus of the invention has particular application for use in hospitals and other medical centres where such syringes are used in large quantities.

According to the invention there is provided waste disposal apparatus comprising an electrically driven comminutor means to receive material to be disposed of, an inlet for liquid to said comminutor means to assist operation, an outlet for discharge from said comminutor means of such liquid carrying comminuted material, a filter unit to receive such discharge, retain therein the comminuted material and allow passage therethrough of the liquid, liquid storage means to receive the liquid passed through said filter unit, and a pump driven to recirculate the liquid from said storage means to said liquid inlet to the comminutor means. The material to be disposed of may be the used disposable syringes, and the recirculating liquid is suitably water.

With an apparatus according to this invention the waste is retained in the filter unit for subsequent disposal or recovery and the apparatus is thus to be distinguished from known comminuting apparatus wherein the comminuted waste is carried away as a liquid suspension and discharged to drain, e.g., into the public sewers. Disposal of synthetic resin waste material into the public sewers is not favoured by public authorities mainly because such waste does not decompose and because in comminuted form such waste tends to block the spray heads or sprinklers of sewage farms. The present invention enables the safe, rapid and ready disposal of synthetic resin waste without the disadvantages referred to. Moreover, the disposal of some treatment materials into the public sewers also meets with disfavour in view of the possibility of build up into quantities interfering with decomposing action. Other advantages will be explained hereinafter.

Advantageously the filter unit comprises a porous container, preferably a disposable mesh bag, which receives the discharge and is removably located in the liquid storage means.

Embodiments of apparatus in accordance with the invention are hereinafter described by way of example with reference to the accompanying drawings wherein.

Figure 1:
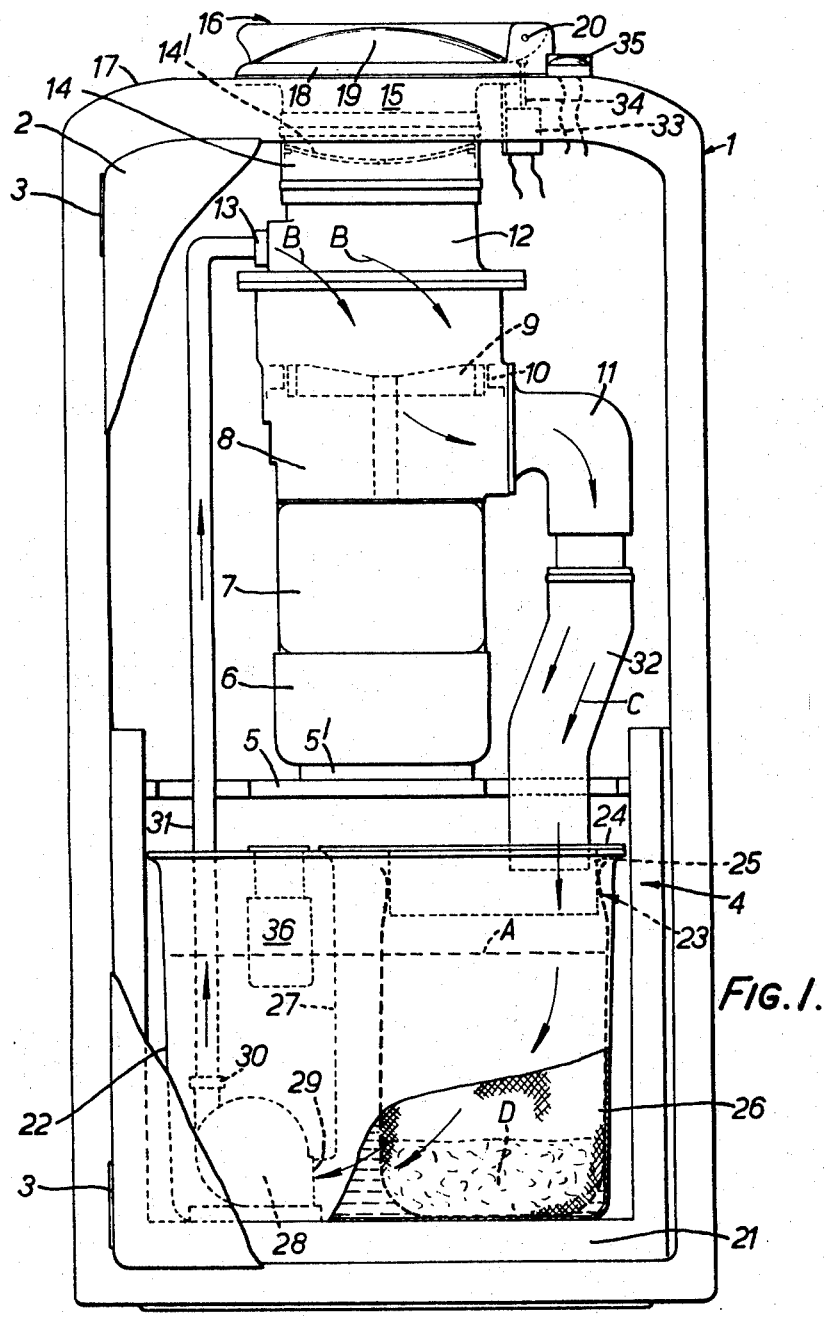
FIG. 1 is a front elevation view of one form of the apparatus.
Figure 2:
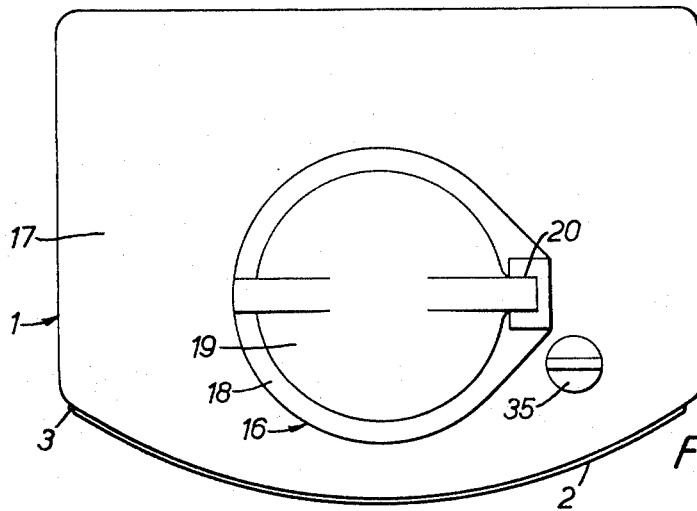
FIG. 2 is a plan view of such apparatus.

Referring to FIGS. 1 and 2, the apparatus is contained in a cabinet 1 e.g., of fibreglass reinforced synthetic resin material, and carrying a door 2 by way of hinges 3 at the front side with any suitable quick action fastening. A metal frame 4 fixed in the lower end of the cabinet presents an upper horizontal transverse support 5 with a cushion 5' for a comminutor unit comprising an electric motor 6 presenting a terminal box 7 and surmounted by a comminutor casing 8. The comminutor comprises a rotary impeller, driven by the motor, co-acting with a ring of teeth, as diagrammatically indicated at 9 and 10 respectively, within the casing. The comminutor has a discharge outlet elbow 11. An annular chute assembly surmounting the comminutor casing comprises an annular canopy 12 having a lateral water inlet at 13, and a resilient collar 14 interposed with appropriate sealing between such canopy and a depending skirt 15 of a cover assembly 16 secured in an opening in the top panelling 17 of the cabinet. The cover assembly comprises an annular seating 18 presenting the skirt 15, which defines an upwardly facing waste inlet, and a cover 19 hingedly mounted at 20 on the seating. The cover may be spring loaded to the closed position. A split flexible anti-splash guard 14' may be secured in place across the waste inlet.

The frame 4 presents a lower horizontal transverse support 21 for a water tank 22 which is laterally removable from the frame with the door opened. A filter unit 23 is removably located within the tank, the unit comprising a plate 24 supported on the upper rim of the tank and having a vertical opening defined by a depending annular skirt 25. A disposable mesh bag 26 e.g., of fabric, or other suitable porous container has its neck tightly received around the skirt 25 and rests on the bottom of the tank. The plate 24 also carries a depending barrier 27 helping to locate the bag in position and reaching down not fully to the tank bottom. An electrically driven sealed pump 28 is submerged in the tank to the opposite side of said barrier from the bag, and has an inlet 29 in the tank and an outlet 30 from which a small bore flexible tube 31 extends upwardly to the water inlet 13 to the comminutor means. The pump could alternatively be arranged to be driven indirectly from the comminutor motor, e.g., by a belt and pully drive from the lower end of such motor. A large bore flexible hose 32 is secured to the discharge elbow 11 and extends down to within the skirt 25 and just below the level of the plate 24.

A safety switch 33 is actuated by an arm 34 upon movement of the cover 19 and is connected in circuit with the comminutor and pump motors to allow operation of same only with the cover in closed position. A variable time switch 35 is also connected in such circuit to allow operation of the comminutor and pump only for a pre-set time interval after the cover is closed. The time switch may be of a mechanical or an electrical type automatically set in operation by closing movement of the cover.

In use, the tank is filled with water to about the level A, e.g., a quantity of 4 gallons. To dispose of waste such as the disposable syringes mentioned, the cover is lifted from its normally closed position, the waste dropped through the chute assembly into the comminutor, and the cover closed. Closing movement of the cover automatically actuates the safety switch 33 to start the comminutor and pump motors. Water is pumped from the storage tank to the water inlet to the chute assembly of the comminutor means and passes down as indicated at B into the comminutor casing and between the impeller and ring of teeth thereby carrying the comminuted waste downwardly away from the impeller to be discharged as indicated at C through the discharge hose into the filter bag. The comminuted waste is retained as indicated at D in the bag while the water passes readily through the bag into the storage tank to be recirculated by the pump. The time switch 35 automatically stops the operation of the comminutor and pump motors at the end of the pre-set time interval after the cover is closed.

Thus the water is re-used upon each operation of the comminutor and the comminuted waste collects in the filter bag. The cabinet door preferably has a transparent panel which enables the filter bag to be seen. When the bag is sufficiently full, the door is opened, the filter unit drawn out, and the full bag removed and replaced by a fresh empty bag. The storage tank may be drawn laterally forward to a certain extent to effect such replacement. The support 5 is suitably cut away to allow lateral displacement of the tube 31 and hose 32.

By way of modification of the filter unit, the plate 24 with skirt 25 may be omitted, and a filter bag be received at its neck directly onto the free lower end of the discharge hose, the bag still seating in the storage tank.

A holder 36 for disinfectant, bactericide, or other water treatment material may be located in the storage tank.

Figure 3:
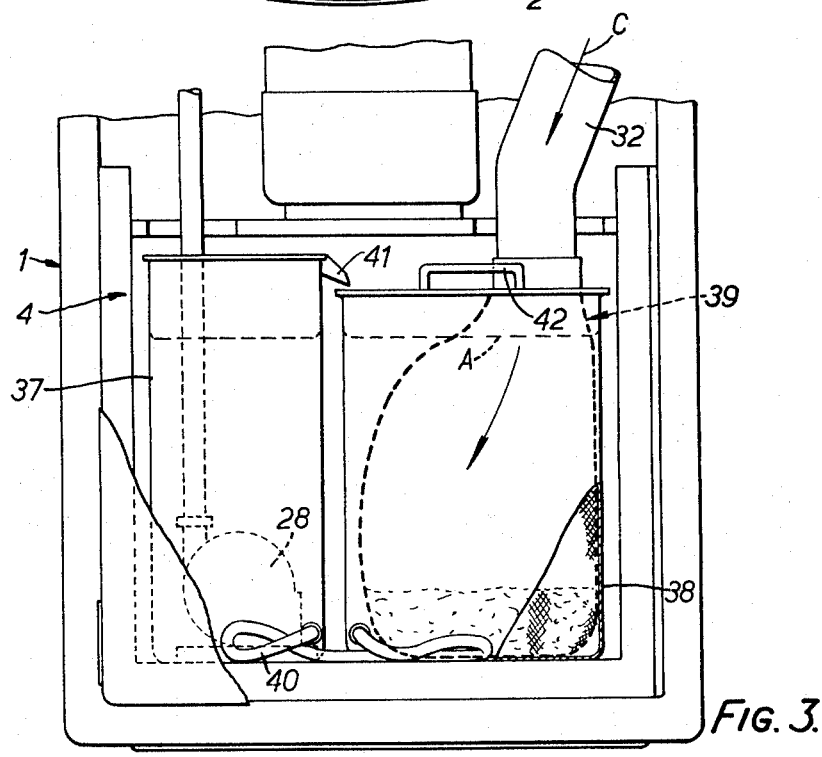
FIG. 3 illustrates a modified arrangement of the liquid storage means and filter unit.

FIG. 3 illustrates a further modified arrangement of the water storage means and filter unit. In this case, the water storage means comprises a relatively fixed tank 37 locating the pump, a removable tank 38 in which the filter unit 39 is removably located, and a flexible hose connection 40 allowing water flow between such tanks. The filter unit comprises a disposable bag such as above, seating in the removable tank and having its neck received onto the free lower end of the discharge hose 32. The fixed tank presents an outlet 41 for water overflow therefrom into the removable tank when the latter is in operative position. With this arrangement the removable tank may be more easily withdrawn from the cabinet to assist replacement of the filter bag and may present suitable handle means e.g., as indicated at 42.

The apparatus of the invention is self-contained except for the electricity supply, and requires no external plumbing to install; thus the unit can be mobile. The stored water need be changed only very infrequently. Using a water treatment material as indicated, the waste can be made safe bacteriologically to handle, since it can be comminuted in a powerful bactericide solution and remains in such a solution for a relatively considerable period of time, as compared with instantaneous disposal to drain. The apparatus has particular application to the disposal of disposable hypodermic syringes as explained, and in addition to the abovementioned advantages concerning the public sewage system, the possibility of immediate disposal of a once used syringe avoids the risk of unintentional re-use or of a used syringe falling into unauthorised hands. All of these problems trouble hospital authorities and the apparatus of the invention solves them most effectively. The apparatus may however be used to dispose of other forms of waste when it is desired to salvage or collect the waste material after comminution, or prevent same from entering public sewers.

I claim:
1. Waste disposal apparatus comprising an electrically driven comminutor means to receive material to be disposed of, an inlet for liquid to said comminutor means to assist operation, an outlet for discharge from said comminutor means of such liquid carrying comminuted material, a porous container to receive such discharge, retain therein the comminuted material and allow passage therethrough of the liquid, liquid storage means to receive the liquid passed through said porous container, and a pump driven to recirculate the liquid from said storage means to said liquid inlet to the comminutor means.

2. Apparatus according to claim 1 wherein the porous container which receives said discharge is removably located in said liquid storage means.

3. Apparatus according to claim 2 wherein said container is a disposable mesh bag.

4. Apparatus according to claim 1 wherein an annular chute assembly surmounts a comminutor chamber casing of said comminutor means, presents an upwardly facing inlet to receive the material to be disposed of, and comprises said liquid inlet to the comminutor means.

5. Apparatus according to claim 1 wherein the liquid storage means comprises a removable tank and the porous container is removably located in such tank.

6. Apparatus according to claim 1 wherein the liquid storage means comprises a single removable tank, the pump and the porous container being located in said tank.

7. Apparatus according to claim 1 wherein the liquid storage means comprises a fixed tank locating the pump; a removable tank; said porous container being removably located in said tank; and a flexible hose connection to allow liquid flow between such tanks.

8. Waste disposal apparatus comprising an electrically driven comminutor means to receive material to be disposed of, an inlet for liquid to said comminutor means to assist operation, an outlet for discharge from said comminutor means of such liquid carrying comminuted material, a porous disposable fabric container to receive such discharge, retain therein the comminuted material and allow passage therethrough of the liquid, liquid storage means to receive the liquid passed through said container and comprising a removable tank in which said container is removably located, and a pump driven to recirculate the liquid from said storage means to said liquid inlet to the comminutor means.

References Cited
UNITED STATES PATENTS

| | | | |
|---|---|---|---|
| 2,400,879 | 5/1946 | Hilliker | 241—46 |
| 2,850,244 | 9/1958 | James et al. | 241—46 |
| 3,034,734 | 5/1962 | Guth | 241—46 |
| 3,048,340 | 8/1962 | Vernon | 241—46 |
| 3,291,399 | 12/1966 | Shepherd | 241—46 |

GERALD A. DOST, *Primary Examiner.*